(12) United States Patent
Renfrew

(10) Patent No.: US 8,156,579 B2
(45) Date of Patent: Apr. 17, 2012

(54) SHOWER ARRANGEMENT

(75) Inventor: Andrew Boulton Renfrew, Staffordshire (GB)

(73) Assignee: Applied Energy Products Limited (GB)

( * ) Notice: Subject to any disclaimer, the term of this patent is extended or adjusted under 35 U.S.C. 154(b) by 1059 days.

(21) Appl. No.: 11/577,460

(22) PCT Filed: Oct. 18, 2005

(86) PCT No.: PCT/GB2005/004021
§ 371 (c)(1),
(2), (4) Date: Mar. 7, 2008

(87) PCT Pub. No.: WO2006/043051
PCT Pub. Date: Apr. 27, 2006

(65) Prior Publication Data
US 2010/0237154 A1    Sep. 23, 2010

(30) Foreign Application Priority Data
Oct. 19, 2004 (GB) .................................. 0423177.5

(51) Int. Cl.
*A47K 3/02* (2006.01)
(52) U.S. Cl. ......... 4/570; 4/567; 4/605; 4/615; 239/282; 239/397.5; 236/12.1; 285/328; 285/330; 137/602; 137/605
(58) Field of Classification Search ............... 4/567, 570, 4/605, 615; 239/280, 282, 283, 397.5, 588; 236/12.1; 138/111; 285/120.1, 328, 330; 137/602, 603, 605, 606
See application file for complete search history.

(56) References Cited

U.S. PATENT DOCUMENTS

| 2,997,722 | A * | 8/1961 | Pearson | 4/570 |
| 4,685,156 | A * | 8/1987 | Brabazon | 4/570 |
| 6,233,757 | B1 * | 5/2001 | Graham et al. | 4/605 |
| 7,310,836 | B2 * | 12/2007 | Glunk | 4/570 |
| 7,766,092 | B2 * | 8/2010 | Perkovich et al. | 285/330 |

FOREIGN PATENT DOCUMENTS

| DE | 2324243 A1 | 5/1974 |
| EP | 0369239 A2 | 5/1990 |
| EP | 0369239 A3 | 5/1990 |
| EP | 1081297 A2 | 7/2001 |
| EP | 1081297 A3 | 7/2001 |
| EP | 1405955 A2 | 7/2004 |
| EP | 1405955 A3 | 7/2004 |
| GB | 2232080 A | 5/1990 |
| GB | 2430152 A | 3/2007 |

OTHER PUBLICATIONS

International Search Report dated Jan. 24, 2006, from related International Application No. PCT/GB2005/004021.

* cited by examiner

*Primary Examiner* — Steven J Ganey
(74) *Attorney, Agent, or Firm* — Young Law Firm, P.C.

(57) ABSTRACT

A shower arrangement (10) includes a mixer valve assembly (110) and conduit means (120) for the supply of water to the assembly (110). The conduit means (120) includes a conduit casing (2) defining an interior (122), a hot water pipe (3) defining a passage (103) for hot water and a cold water pipe (4) defining a passage (104) for cold water, the hot and cold water pipes (3, 4) being located in the interior (122).

38 Claims, 3 Drawing Sheets

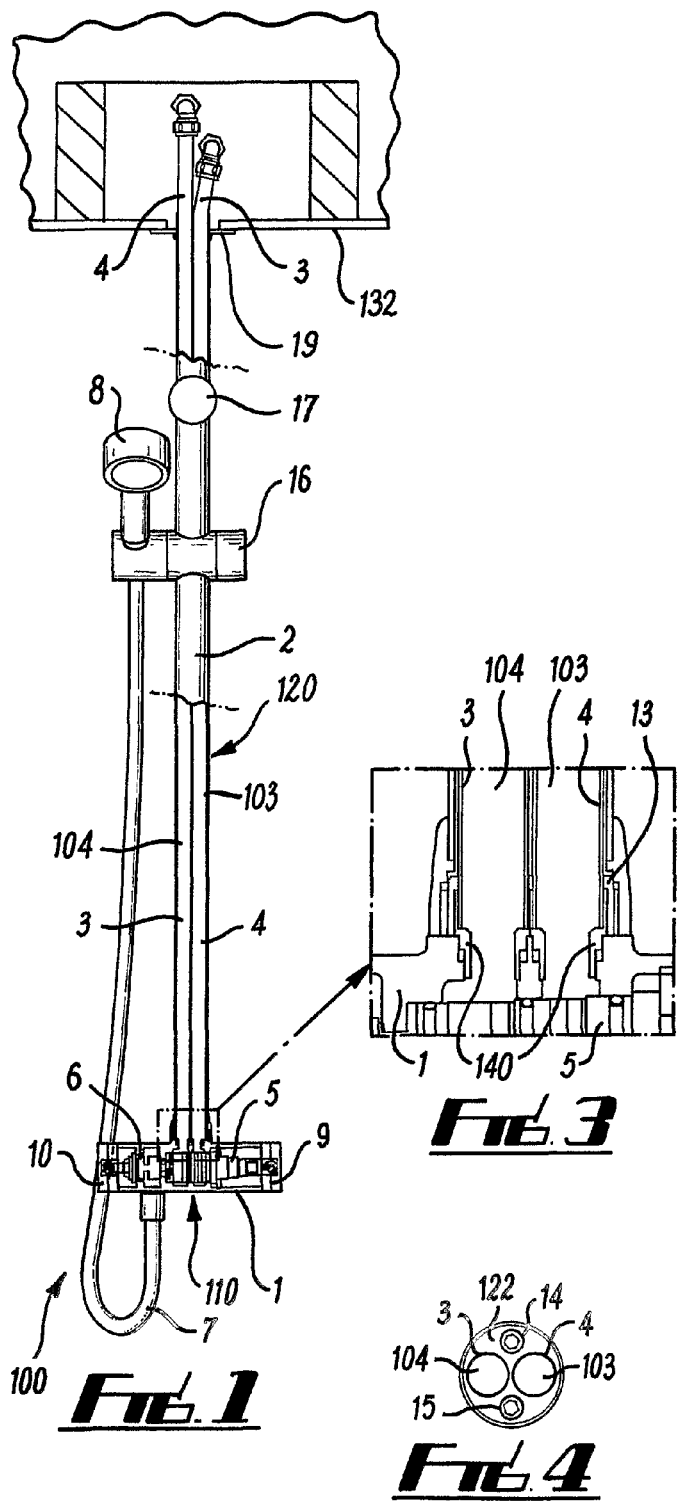

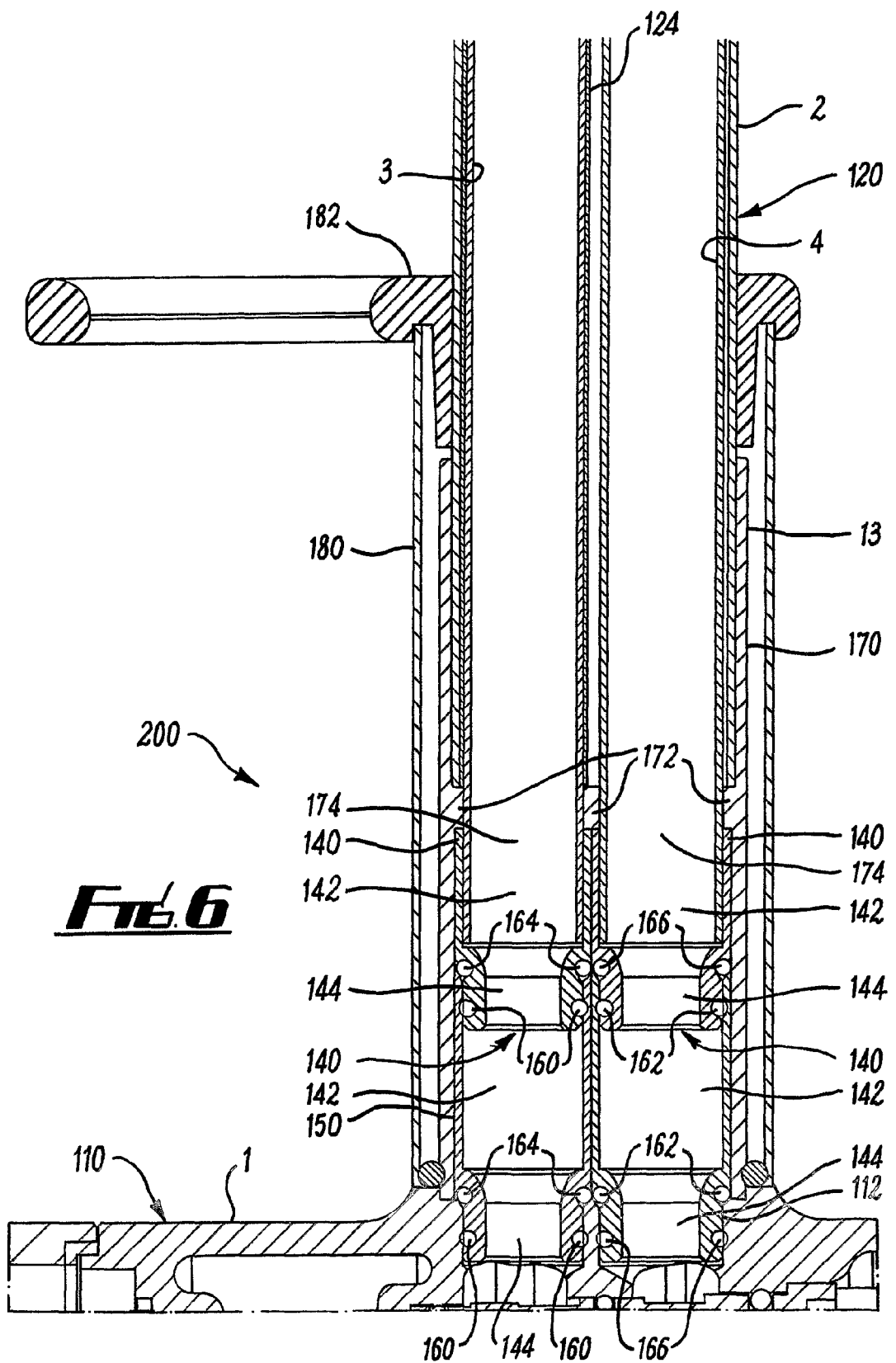

SHOWER ARRANGEMENT

The present invention relates to shower arrangements.

Conventionally, shower arrangements can include a mixer valve assembly which is fed with hot and cold water by hot and cold water pipes. The mixer valve assembly mixes the hot and cold water and supplies the mixed water at a suitable temperature to a shower head, commonly via a flexible hose. Most mixer valve assemblies are designed to be supplied with hot and cold water from pipes that are normally 150 mm apart at entry to the mixer valve assembly, and normally the hot and cold water pipes are concealed behind a wall to which the mixer valve assembly is mounted. Installing such a conventional shower arrangement is a relatively time consuming task as channels for the pipes may have to be formed in the wall, and following installation, the wall made good and retiled. Clearly, should any problems arise with the installation, the tasks of maintenance and/or repair can also be similarly time consuming. Alternatively, the hot and cold water pipes can be left exposed to view, but this provides a relatively unattractive and cluttered environment in the vicinity of the shower arrangement. Additionally, a riser rail is often provided to adjustably support the shower head.

According to one aspect of the present invention, there is provided a shower arrangement, the arrangement including a mixer valve assembly and conduit means for the supply of water to the assembly, the conduit means including a conduit casing defining an interior, a hot water pipe defining a passage for hot water and a cold water pipe defining a passage for cold water, the hot and cold water pipes being located in the interior.

The casing may be in the form of a tube. Preferably the shower arrangement includes a mounting for mounting a shower head to the conduit casing, and the casing may form a riser rail for the shower head. Preferably the mounting is adjustable to permit adjustment of the position of the shower head relative to the conduit casing.

Preferably the shower arrangement includes a hose member which defines a passage and is arranged so that in use the passage communicates water from the mixer valve assembly to the shower head.

Preferably the conduit casing extends in use from the mixer valve assembly to a wall, a floor or a ceiling, and desirably in use extends upwardly to a ceiling.

Preferably the conduit casing is arranged so that, in use, the hot and cold water pipes are substantially hidden from view.

Preferably the conduit means include connector means for connecting each of the hot and cold water pipes to the mixer valve assembly. Preferably the connector means include a pair of connectors, one connector for each of the hot and cold water pipes. Preferably each connector includes a socket part in which the hot or cold water pipe is receivable. Preferably the respective pipe is fixed within each socket part by bonding means. Preferably each connector includes a spigot part which may be receivable in a socket defined by the mixer valve assembly, and may be a push fit in the mixer valve assembly socket.

Preferably the connector means include a pair of check valve housings. Preferably each check valve housing is locatable between one of the connectors and the mixer valve assembly. Preferably each check valve housing includes a spigot part, which may be receivable in a socket defined by the mixer valve assembly, and may be a push fit in the mixer valve assembly socket. Preferably the spigot part of each check valve housing is substantially similar to the spigot part of each connector.

Preferably each check valve housing includes a socket part in which one of the connector spigot parts is receivable. Preferably the connector spigot part is a push fit within the check valve housing socket part. Preferably the check valve housing socket part is substantially similar to the mixer valve assembly socket.

Preferably the connector means include sealing means. Preferably the sealing means include a plurality of seal members, each of which may be formed of a resilient material. Preferably each spigot part defines a seal recess, for receiving a part of one of the seal members.

Preferably the connector means include buffer means. Preferably the buffer means include a plurality of buffer members, each of which may be formed of a resilient material. Preferably each spigot part defines a buffer recess, for receiving a part of one of the buffer members.

Preferably the arrangement includes clamping means for clamping the connectors to the mixer valve assembly. Preferably the clamping means include a clamp member which in use applies a clamping force to urge the connectors towards the mixer valve assembly. Preferably the clamping means include fastening means for fastening the clamp member to the mixer valve assembly.

Preferably the conduit means include insulation means to insulate the hot water pipe. Preferably the insulation means include an insulation sleeve, which may extend substantially around and along the length of the hot water pipe.

Preferably the hot and cold water pipes are of at least 15 mm outside diameter.

Preferably the connectors and/or check valve housings are formed of a relatively high strength machinable material, and may be formed of brass.

Further according to the present invention, there is provided a connector for a shower arrangement as described above in any of the preceding paragraphs.

Further according to the present invention, there is provided a mixer valve assembly for a shower arrangement as described above in any of the said preceding paragraphs.

Further according to the present invention, there is provided conduit means for a shower arrangement, the conduit means including a conduit casing defining an interior, a hot water pipe defining a passage for hot water and a cold water pipe defining a passage for cold water, the hot and cold water pipes being located in the interior.

Preferably the shower arrangement is as described above in any of the said preceding paragraphs.

Further according to the present invention, there is provided a method of providing a shower arrangement, the method including the steps of providing a mixer valve assembly and connecting conduit means to the mixer valve assembly for the supply of water to the assembly, the conduit means including a conduit casing defining an interior, a hot water pipe defining a passage for hot water and a cold water pipe defining a passage for cold water, the hot and cold water pipes being located in the interior.

Preferably the shower arrangement is as described above in any of the said preceding paragraphs.

According to another aspect of the present invention, there is provided a connection arrangement for connecting a member to an item, the connection arrangement including a connector, the connector including a socket part in which the member is receivable, a spigot part receivable in a socket defined by the item and clamping means for clamping the connector to the item.

Preferably the member is fixed within the socket part by bonding means. Preferably the spigot part of the connector is a push fit in the item socket.

Preferably the connection arrangement includes sealing means. Preferably the sealing means include a seal member, which may be formed of a resilient material. Preferably the spigot part includes a seal recess for receiving a part of the seal member.

Preferably the connection arrangement includes buffer means. Preferably the buffer means include a buffer member, which may be formed of a resilient material. Preferably the spigot part includes a buffer recess, for receiving a part of the buffer member.

Preferably the clamping means include a clamp member, which in use applies a clamping force to urge the connector towards the item. Preferably the clamping means include fastening means for fastening the clamp member to the item.

Preferably the connection arrangement is arranged to connect a plurality of relatively closely spaced members to the item, and may include a plurality of connectors, each connector being associated with one of the members. Preferably each of the spigot parts of each of the connectors are receivable in one of a plurality of sockets defined by the item. Preferably the clamp member applies a clamping force to each of the connectors.

Embodiments of the present invention will now be described by way of example only and with reference to the accompanying drawings, in which:—

FIG. 1 is a part cross sectional view from the front of a shower arrangement in an installed condition;

FIG. 2 is a part cross sectional view from the side of the shower arrangement of FIG. 1;

FIG. 3 is an enlarged cross sectional view of part of the shower arrangement of FIG. 1;

FIG. 4 is a cross sectional view from above through another part of the shower arrangement of FIG. 1;

FIG. 6 is a cross sectional view of the part of the shower arrangement of FIG. 5.

Figure 5:
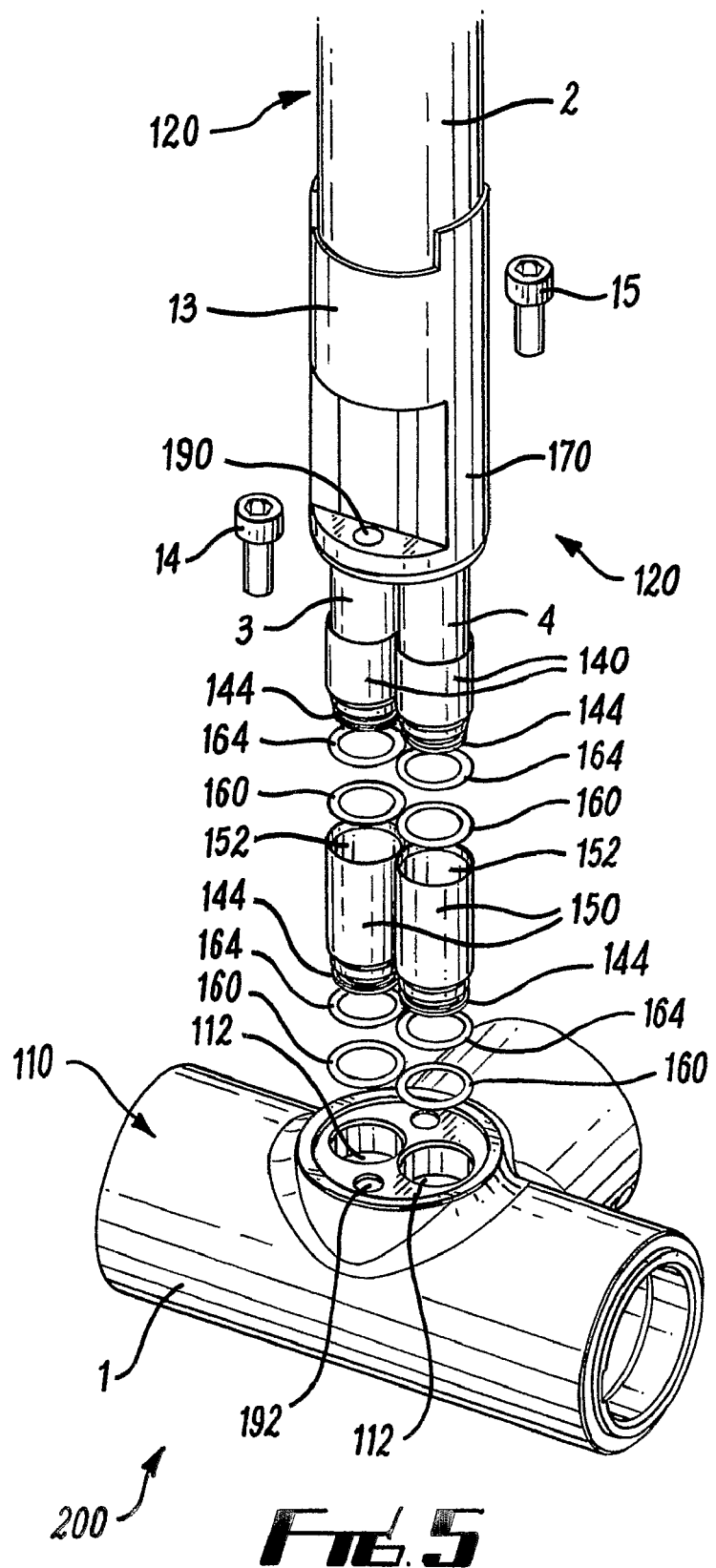
FIG. 5 is an exploded perspective view of part of another shower arrangement.

FIGS. 1 and 2 show a shower arrangement 100 comprising a mixer valve assembly 110 and conduit means 120.

The mixer valve assembly 110 includes a thermostatically controlled valve 5 located within a valve body housing 1.

The conduit means 120 include a hot water supply pipe 3 and a cold water supply pipe 4, each pipe 3, 4 defining a passage 103, 104 for hot water and cold water respectively. Hot water supply pipe 3 and cold water supply pipe 4 are arranged to feed water to the valve 5.

The conduit means 120 include a casing in the form of a riser rail tube 2 which defines an interior 122, and the hot water supply pipe 3 and cold water supply pipe 4 are located within the interior 122. The shower arrangement 120 includes a mounting for mounting a shower head 8 to the conduit riser rail tube 2, the mounting being in the form of an adjustable bracket 16 which permits adjustment of the position of the shower head 8 relative to the riser rail tube 2.

The shower arrangement 120 includes a hose member 7 which defines a passage 107, the hose member 7 being arranged so that in use the passage 107 communicates water from the mixer valve assembly 110 to the shower head 8.

The shower arrangement 100 includes mounting brackets 17, 18 for mounting the riser rail tube 2 and the mixer valve assembly 110 respectively to a wall 130. FIGS. 1 and 2 show the shower arrangement 100 in an installed condition, in which the riser rail tube 2 extends upwardly from the mixer valve assembly 110 through an aperture 134 defined in a ceiling 132. The riser rail tube 2 is arranged so that in the installed condition, the hot and cold water pipes 3, 4 are substantially hidden from view. The hot and cold water pipes 3, 4 extend out of the riser rail tube 2 to connect with plumbing system pipes 136. A finish plate 19 provides a neat cover below the aperture 134 formed in the ceiling 132 around the riser rail tube 2.

The conduit means 120 include connector means in the form of connectors 140 which connect the hot and cold pipes 3, 4 to the mixer valve assembly 110. The connectors 140 are in the form of ferrules which are fixed to the ends of the pipes 3, 4.

The connector means include clamping means for clamping the connectors 140 to the mixer valve assembly 110, the clamping means including a clamp member 13 which is fastened to the valve body housing 1 by fasteners in the form of bolts 14, 15.

In use, water is supplied from the plumbing system pipes 136 to the hot and cold water supply pipes 3, 4 and through the hot and cold pipes 3, 4 to the thermostatically controlled valve 5, where the hot and cold water is mixed. The mixed water flows through a control valve 6 via the flexible hose member 7 to the shower head 8. A user can adjust the temperature and flow of the mixed water by means of temperature control knob 9 and flow control knob 10. The height and angle of the shower head 8 can be adjusted by means of the adjustable mounting bracket 16.

The feature of the riser rail tube 2 defining the interior 122 for the hot and cold water supply pipes 3, 4 permits a simple and neat installation. The hot and cold water pipes 3, 4 are not visible to the user. The wall 130 and any decoration such as tiles on the surface of the wall does not have to be disturbed, so that installation is simple and quick, and any maintenance required can be carried out easily.

FIGS. 5 and 6 show in more detail another, similar embodiment of the invention. Many features are similar or the same as those previously described, and for such features the same reference numerals have been retained.

FIGS. 5 and 6 show a shower arrangement 200, the shower arrangement 200 including a mixer valve assembly 110, the mixer valve assembly 110 including a valve body housing 1.

The shower arrangement 200 includes conduit means 120, the conduit means 120 including a casing in the form of a riser rail tube 2 defining an interior 122 in which is located a hot water pipe 3 and cold water pipe 4.

The conduit means 120 include connector means for connecting each of the hot and cold water pipes 3, 4 to the mixer valve assembly 110.

The connector means include a pair of connectors 140, one connector for each of the hot and cold water pipes 3, 4. Each of the connectors 140 includes the socket part 142 in which the hot or cold water pipe 3,4 is receivable. The respective pipe 3, 4 is fixed within each socket part 142 by bonding means, which could, for example, comprise a suitable adhesive, or could comprise a suitable operation such as soldering.

In the example of the embodiment shown in FIGS. 5 and 6, the connector means include a pair of check valve housings 150, each of which includes a check valve through which the water passes to the mixer valve assembly 110. The check valve housings 150 are located between the connectors 140 and the mixer valve assembly 110.

Each check valve housing 150 includes a socket part 152 in which a spigot part 144 of one of the connectors 140 is receivable. Each of the check valve housings 150 also includes a spigot part 144 which is substantially similar to the spigot part 144 of each of the connectors 140, and is receivable within a socket 112 defined by the mixer valve assembly 110. The mixer valve assembly socket 112 is substantially similar to the socket part 152 of the check valve housing 150 and the socket part 142 of the connector 140.

The connector means include sealing means in the form of a plurality of seal members 160, each of which is formed of a resilient material, which could for instance be a plastics material such as an elastomer. Each of the spigot parts 144 of the connectors 140 and the check valve housing 150 defines a seal recess 162 for receiving a part of one of the seal members 160.

The seal members 160, the socket parts 152, spigot parts 144 and mixer valve assembly sockets 112 form push fit connections in which a water tight connection is made simply by pushing the respective spigot part 144 into the respective socket part 152 or socket 112.

The connector means also include buffer means, the buffer means including a plurality of buffer members 164 each of which may be formed of a resilient material, which could for instance be a plastics material such as an elastomer. Each of the spigot parts 144 of the connectors 140 and check valve housings 150 defines a buffer recess for receiving a part of one of the buffer members 164.

The arrangement 200 includes clamping means for clamping the connector means to the mixer valve assembly 110. The clamping means include a clamp member 13, the clamp member 13 including a substantially tubular casing part 170 which, in an assembled condition, extends around the ends of the hot and cold pipes 3, 4, the connectors 140 and the check valve housings 150 and seats on the mixer valve body housing 1 as shown in FIG. 6. The clamp member 13 includes a clamp wall 172 which extends laterally across the interior of the casing part 170 and defines a pair of apertures 174. The apertures 174 are of a size such that the hot and cold water pipes 3, 4 can pass through the apertures 172, but are too small to permit the connectors 140 to pass therethrough. The casing part 170 defines a pair of fastener apertures 190 through which fasteners 14, 15 are locatable, the fasteners 14, 15 locating in threaded fastener holes 192 defined by the mixer valve assembly 110.

In use, the conduit means 120 are assembled to the mixer valve assembly 110 as follows. The hot and cold water pipes 3, 4 are inserted into the socket parts 142 of the connectors 140 and bonded into position by soldering to form a water tight connection. The spigot parts 144 of the connectors 140 are then inserted into the socket parts 152 of the check valve housings 150 and the spigot parts 144 of the check valve housings 150 are inserted into the sockets 112 of the mixer valve assembly 110. As each of the spigot parts 144 is inserted into the socket parts 142, the seal members 160 located within the seal recesses 162 are compressed between the spigot parts 144 and the socket parts 142 to form a water tight seal therebetween.

The clamp member 13 is then positioned over the hot and cold water pipes 3, 4 with the pipes 3, 4, passing through the apertures 174 in the clamp wall 172, and the clamp member 13 positioned so that the wall 172 bears down on the connectors 140. The fasteners 14, 15 are located through the fastener apertures 190 into the threaded fastener holes 192 and tightened, applying a clamping force to the connectors 140 and urging the connectors 140 towards the mixer valve assembly 110. As the clamping force is applied, the connectors 140 and the check valve housings 150 are moved towards each other and towards the mixer valve assembly 110 until the buffer members 164 are compressed. The buffer members 164 act to equalize the clamping force applied between the connectors 140, taking up any slight dimensional differences therebetween.

With the clamp member 13 in position, the riser rail tube 2 is then located over and around the hot and cold pipes 3, 4 the riser rail tube 2 seating on the wall 172 of the clamp member 13. Insulation means in the form of an insulation sleeve 124 of plastics material can then be positioned substantially around and along the length of the hot water pipe 3. The insulation sleeve 124 reduces heat loss from the hot water pipe 3 and the risk of a user sustaining an injury from the riser rail tube 2 which can heat up during extended operation.

For decorative purposes a clamp cover 180 can then be positioned over the clamp member 13. A clamp cap 182 can be seated tightly against the riser rail tube 12 and over the clamp cover 180.

In one example, the connectors 140 and the check valve housings 150 are formed of a relatively high strength machinable material such as brass. The hot and cold water pipes 3, 4 are of at least 15 mm outside diameter. Pipes of this size allow adequate flow to the shower arrangement. The use of a relatively high strength material permits the connectors 140 and check valve housings 150 to be relatively thin walled, thus allowing the hot and cold water pipes 3, 4 to be positioned relatively closely to each other.

Conventionally, the use of such pipes requires the use of relatively bulky connectors which then require the hot and cold water pipes to be spaced relatively far apart. The shower arrangement of the present invention permits the hot and cold water pipes 3, 4 to be positioned substantially alongside and abutting each other, thus permitting a riser rail tube of relatively compact diameter and a neat and relatively compact connection between the hot and cold water pipes and the mixer valve assembly.

Various modifications could be made without departing from the scope of the invention. The conduit means could be connected to the mixer valve assembly in any suitable orientation. The mixer valve assembly could include any suitable combination of controls as required. The hose member defining the passage between the mixer valve assembly and the shower head could be flexible, or alternatively could be rigid. The conduit means could include a conduit casing in a form other than that of a tube. For example, the conduit means could include a casing of rectangular or square hollow section, or could include simply a casing in the form of a facing cover to which the shower head mounting bracket is mounted. The pipes could be arranged differently. For example, one pipe could be inside another.

The shower arrangement could include the check valve housings 150 as described in relation to the embodiments shown in FIGS. 5 and 6, or the check valves could be positioned elsewhere in the system or the arrangement, and the connectors 140 could be connected directly to the valve body housing 1, similar to the arrangement shown in FIG. 3.

The seal recesses and buffer recesses could be of any suitable size and shape and located in any suitable position. The seal members and buffer members could be of any suitable size and shape, and formed of any suitable material. The clamp member could be of any suitable size and shape.

There is thus provided a shower arrangement in which the hot and cold water pipes supplying the mixer valve are concealed within a riser rail tube which mounts the shower head, providing a neat, attractive and uncluttered installation which is easier to install and maintain in comparison with conventional arrangements.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A shower arrangement, the arrangement including a mixer valve assembly and a conduit for the supply of water to the mixer valve assembly, the conduit including a conduit casing defining an interior, a hot water pipe defining a passage for hot water and a cold water pipe defining a passage for cold water, the hot and cold water pipes being located in the interior, the mixer valve assembly including a flow control valve for controlling a flow of mixed hot and cold water and a temperature control valve for controlling a temperature of the mixed water, the shower arrangement further comprising a mount for mounting a shower head to the conduit casing, the conduit casing forming a riser rail for the shower head with each of the hot water pipe and cold water pipe extending along the interior of the conduit casing so that the hot water and cold water are communicated separately along the hot water pipe and cold water pipe substantially from one end of the conduit casing to an other end of the conduit casing, and then to the mixer valve assembly.

2. The shower arrangement according to claim 1, wherein the casing is in the form of a tube.

3. The shower arrangement according to claim 1, wherein the shower arrangement includes a mounting for mounting a showerhead to the conduit casing, and wherein the casing forms a riser rail for the showerhead.

4. The shower arrangement according to claim 3, wherein the mounting is adjustable to permit adjustment of the position of the showerhead relative to the conduit casing.

5. The shower arrangement according to claim 3, wherein the shower arrangement includes a hose member, which defines a passage and is, arranged so that in use the passage communicates water from the mixer valve assembly to the showerhead.

6. The shower arrangement according to claim 1, wherein the conduit casing extends in use from the mixer valve assembly to one of a wall, a floor and a ceiling.

7. The shower arrangement according to claim 1, wherein the conduit casing is arranged so that, in use, the hot and cold water pipes are substantially hidden from view.

8. The shower arrangement according to claim 1, wherein the conduit includes a connector assembly for connecting each of the hot and cold water pipes to the mixer valve assembly.

9. The shower arrangement according to claim 8, wherein the connector assembly includes a first connector for the hot water pipe and a second connector for the cold water pipe.

10. The shower arrangement according to claim 9, wherein the first connector includes a first socket to which the hot water pipe is coupled and the second connector includes a second socket to which the cold water pipe is coupled.

11. The shower arrangement according to claim 10, wherein the hot water pipe is coupled to the first socket by first bonding means and wherein the cold water pipe is coupled to the second socket by second bonding means.

12. The shower arrangement according to claim 9, wherein each of the first and second connectors includes a spigot part which is receivable in a socket defined by the mixer valve assembly.

13. The shower arrangement according to claim 12, wherein each spigot part is push fit in the respective mixer valve assembly socket.

14. The shower arrangement according to claim 12, wherein the connector assembly includes a pair of check valve housings.

15. The shower arrangement according to claim 14, wherein each check valve housing of the pair of check valve housings is locatable between one of the connectors and the mixer valve assembly.

16. The shower arrangement according to claim 15, wherein each check valve housing of the pair of check valve housings includes a spigot part, which is receivable in a socket defined by the mixer valve assembly.

17. The shower arrangement according to claim 16, wherein each check valve spigot part is push fit in the respective mixer valve assembly socket.

18. The shower arrangement according to claim 16, wherein the spigot part of each check valve housing is substantially similar to the spigot part of each connector.

19. The shower arrangement according to claim 14, wherein each check valve housing includes a socket part in which one of the connector spigot parts is receivable.

20. The shower arrangement according to claim 19, wherein the connector spigot part is push fit within the check valve housing socket part.

21. The shower arrangement according to claim 19, wherein the check valve housing socket part is substantially similar to the mixer valve assembly socket.

22. The shower arrangement according to claim 8, wherein the connector assembly includes a seal.

23. The shower arrangement according to claim 22, wherein the seal includes a plurality of seal members, each of which is formed of a resilient material.

24. The shower arrangement according to claim 21, wherein each spigot part defines a seal recess, for receiving a part of one of the seal members.

25. The shower arrangement according to claim 12, wherein the connector assembly includes a buffer.

26. The shower arrangement according to claim 25, wherein the buffer include a plurality of buffer members, each of which is formed of a resilient material.

27. The shower arrangement according to claim 26, wherein each spigot part defines a buffer recess, for receiving a part of one of the buffer members.

28. The shower arrangement according to claim 9, wherein the arrangement includes a clamp for clamping the first and second connectors to the mixer valve assembly.

29. The shower arrangement according to claim 28, wherein the clamp include a clamp member that is configured to apply a clamping force to urge the first and second connectors towards the mixer valve assembly.

30. The shower arrangement according to claim 29, wherein the clamp include a fastener for fastening the clamp member to the mixer valve assembly.

31. The shower arrangement according to claim 1, wherein the conduit includes insulation to insulate the hot water pipe.

32. The shower arrangement according to claim 31, wherein the insulation includes an insulation sleeve, which extends substantially around and along the length of the hot water pipe.

33. The shower arrangement according to claim 1, wherein the hot and cold water pipes are of at least 15 mm outside diameter.

34. The shower arrangement according to claim 9, wherein the connector assembly include a pair of check valve housings and wherein at least one of the first and second connectors and check valve housings are formed of a machinable material.

35. The shower arrangement according to claim 34, wherein at least one of the first and second connectors and the pair of check valve housings include brass.

36. A connector for use in a shower arrangement according to claim 1.

37. A mixer valve assembly for use in a shower arrangement according to claim 1.

38. A method of providing a shower arrangement, the method comprising the steps of providing a mixer valve assembly and connecting a conduit to the mixer valve assembly for the supply of water to the mixer valve assembly, the conduit including a conduit casing defining an interior, a hot water pipe defining a passage for hot water and a cold water pipe defining a passage for cold water, the hot and cold water pipes being located in the interior, the mixer valve assembly including a flow control valve for controlling a flow of mixed hot and cold water and a temperature control valve for controlling a temperature of the mixed water, the shower arrangement further comprising a mount for mounting a shower head to the conduit casing, the conduit casing forming a riser rail for the shower head with each of the hot water pipe and cold water pipe extending along the interior of the conduit casing so that the hot water and cold water are communicated separately along the hot water pipe and cold water pipe substantially from one end of the conduit casing to an other end of the conduit casing, and then to the mixer valve assembly.

* * * * *